(12) United States Patent
Terashima (10) Patent No.: US 8,888,348 B2
(45) Date of Patent: Nov. 18, 2014

(54) LIGHTING DEVICE, DISPLAY DEVICE AND TELEVISION RECEIVER

(75) Inventor: Kentaro Terashima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/008,972

(22) PCT Filed: Apr. 3, 2012

(86) PCT No.: PCT/JP2012/059066
§ 371 (c)(1),
(2), (4) Date: Sep. 30, 2013

(87) PCT Pub. No.: WO2012/137772
PCT Pub. Date: Oct. 11, 2012

(65) Prior Publication Data
US 2014/0111697 A1    Apr. 24, 2014

(30) Foreign Application Priority Data

Apr. 8, 2011 (JP) ................. 2011-086123

(51) Int. Cl.
*F21V 8/00* (2006.01)
*G02F 1/1335* (2006.01)

(52) U.S. Cl.
CPC ........ *G02B 6/0055* (2013.01); *G02F 1/133615* (2013.01); *G02F 1/133617* (2013.01)
USPC ........................................... 362/608; 362/84

(58) Field of Classification Search
USPC .................... 362/608, 609, 610, 84
See application file for complete search history.

(56) References Cited

U.S. PATENT DOCUMENTS

| | | | |
|---|---|---|---|
| 8,740,438 B2* | 6/2014 | Hu et al. | 362/606 |
| 2003/0081402 A1* | 5/2003 | Jeon et al. | 362/26 |
| 2008/0025045 A1* | 1/2008 | Mii | 362/611 |
| 2010/0238381 A1* | 9/2010 | Oshima et al. | 349/71 |
| 2010/0283914 A1* | 11/2010 | Hamada | 348/731 |
| 2011/0134626 A1* | 6/2011 | Pugh et al. | 362/84 |
| 2013/0114299 A1* | 5/2013 | Lee et al. | 362/612 |
| 2013/0114301 A1* | 5/2013 | Um | 362/621 |

FOREIGN PATENT DOCUMENTS

| | | |
|---|---|---|
| JP | 7-248495 A | 9/1995 |
| JP | 2005-294288 A | 10/2005 |
| JP | 2009-26614 A | 2/2009 |
| JP | 2009-301725 A | 12/2009 |

* cited by examiner

*Primary Examiner* — Laura Tso
(74) *Attorney, Agent, or Firm* — Chen Yoshimura LLP (57) ABSTRACT

Provided is an illumination device that is capable of improving the utilization efficiency of light, while being lighter and thinner. This illumination device (10) is provided with: a light source (11) that emits ultraviolet light; a light guide plate (14) that guides the light from the light source; an optical member (15) placed between the light source and the light guide plate and that allows ultraviolet light emitted from the light source to pass through and that reflects visible light; and a fluorescent member (16) that is arranged between an ultraviolet light incident surface (15d) of the optical member and the light guide plate and that converts the ultraviolet light into visible light.

12 Claims, 5 Drawing Sheets

LIGHTING DEVICE, DISPLAY DEVICE AND TELEVISION RECEIVER

TECHNICAL FIELD

The present invention relates to an illumination device, a display device, and a television receiver. In particular, the present invention relates to an illumination device provided with a light source and a light guide plate that guides light from the light source, a display device, and a television receiver.

BACKGROUND ART

A liquid crystal display device (a display device) equipped with a non-light-emitting display panel (a member to be illuminated) typically has a backlight device (an illumination device) that irradiates the display panel with light. A backlight device provided with a plurality of LEDs (Light Emitting Diodes) (light sources) and a light guide plate that guides light from these LEDs is known as such a backlight device.

Figure 10:
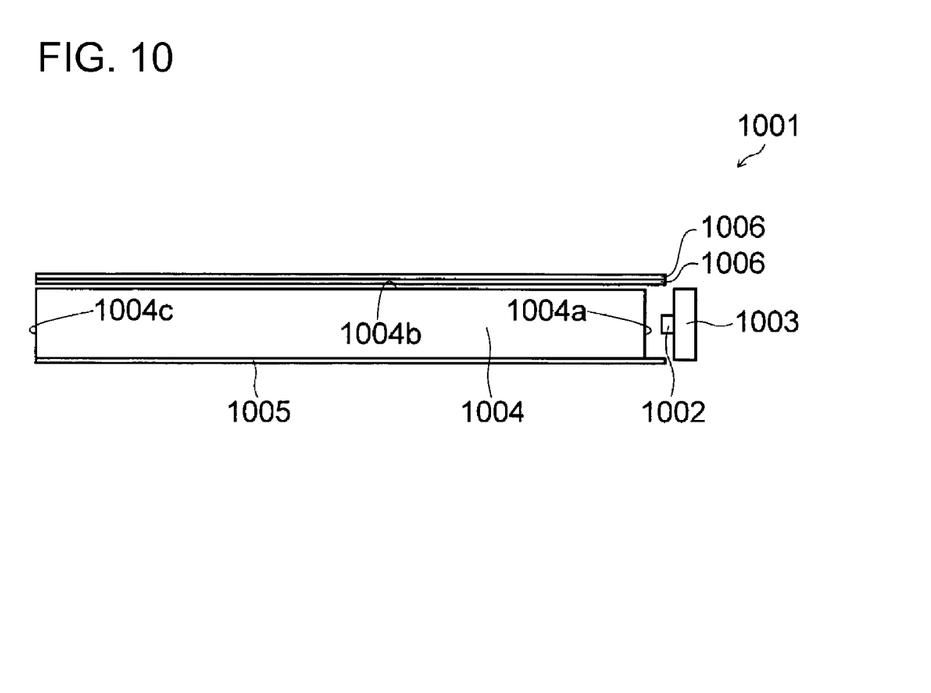
FIG. 10 is a cross-sectional view showing a structure of one example of a conventional backlight device provided with an LED and a light guide plate.

FIG. 10 is a cross-sectional view showing the structure of one example of a conventional backlight device provided with an LED and a light guide plate. As shown in FIG. 10, one example of a conventional backlight device 1001 is provided with an LED (light source) 1002, a mounting substrate 1003 whereon the LED 1002 is mounted, a light guide plate 1004 that guides light from the LED 1002, a reflective sheet 1005 placed on the back side of the light guide plate 1004, and a plurality of optical sheets 1006 placed on the front side (a light exiting surface 1004b) of the light guide plate 1004. In this backlight device 1001, the light emitted by the LED 1002 is incident on a light incident surface 1004a of the light guide plate 1004, and is emitted towards a not-shown display panel (the member to be illuminated) from the light exiting surface 1004b of the light guide plate 1004.

However, in the backlight device 1001, a portion of the light that is incident on the light guide plate 1004 reaches an opposing surface 1004c that is opposite to the light incident surface 1004a of the light guide plate 1004. If the light that reaches the opposing surface 1004c leaks to outside of the light guide plate 1004, then light is not able to be sufficiently utilized. Therefore, a method is widely used in which a reflective tape (not shown) or the like is provided on the opposing surface 1004c to return the light being emitted to outside from the opposing surface 1004c back to inside the light guide plate 1004 by using the reflective tape or the like.

Figure 11:
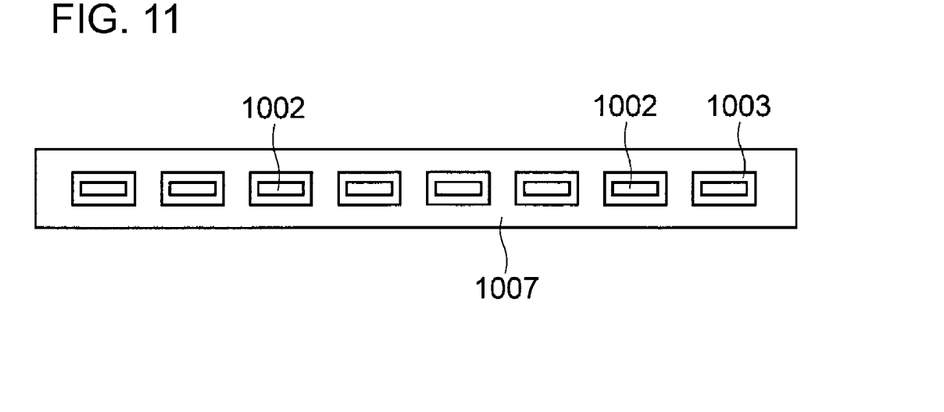
FIG. 11 is a view showing a state in which a white layer is provided on a mounting substrate of one example of a conventional backlight device.

A portion of the light reflected by the opposing surface 1004c will also be emitted to the LED 1002 side from the light incident surface 1004a of the light guide plate 1004. Light being reflected by the opposing surface 1004c leaking to outside the light guide plate 1004 from the light incident surface 1004a also means that light is not able to be sufficiently utilized. Thus, as shown in FIG. 11, a method was used in which a white layer (white resist or white tape) 1007 is provided on the surface of the mounting substrate 1003 to return the light emitted from the light incident surface 1004a back to inside the light guide plate 1004.

Conventionally, an illumination device that can improve the utilization efficiency of light emitted from the LEDs to some degree has been proposed (see Patent Document 1, for example). A light-emitting device (an illumination device) is disclosed in Patent Document 1 provided with a light-emitting diode (a light source) that emits near-ultraviolet light, a flat plate-like light guide body (a light guide plate) that guides light from the light-emitting diode, an optical filter placed on a light exiting surface of the light guide body, and phosphors (fluorescent members) placed on the light exiting side of the optical filter.

The phosphors in this light-emitting device function to convert near-ultraviolet light into visible light. The optical filter also functions to allow near-ultraviolet light to pass through and reflects visible light. This enables suppression of visible light returning back to the light guide body because the visible light emitted from the phosphors to the light guide body is reflected by the optical filter.

RELATED ART DOCUMENT

Patent Document

Patent Document 1: Japanese Patent Application Laid-Open Publication No. 2005-294288 (Page 8, FIG. 5(A))

SUMMARY OF THE INVENTION

Problems to be Solved by the Invention

However, as shown in FIG. 11, even when the white layer 1007 is provided on the surface of the mounting substrate 1003, the white layer 1007 is not capable of covering the entire surface of the mounting substrate 1003, and a portion of the light that returns from the light guide plate 1004 is absorbed by the mounting substrate 1003. This is because wiring made of Cu or the like is formed on the mounting substrate 1003. The wiring is necessary to connect the LEDs 1002 and thus cannot be covered by the white layer 1007. When the wiring is made of Cu, reflectance is lowered because the reflectance of the visible light region is around 50% to 70%. This results in a portion of the visible light being absorbed by the mounting substrate 1003.

The white layer 1007 also cannot cover the surface of the LEDs 1002, so a portion of the light is absorbed by the LEDs 1002. Thus, this poses a problem for improving the utilization efficiency of the light. In a similar manner, in the light-emitting device in Patent Document 1, a portion of the light that returns to the light-emitting diode after being reflected by the opposing surface (the side opposite to the light incident surface) of the light guide body is absorbed by the light-emitting diode, so this poses a problem for improving the utilization efficiency of the light.

In the light-emitting device in Patent Document 1, the optical filter and the phosphors (the fluorescent members) are placed on the light exiting surface of the light guide body, so there is also the problem of the optical filter and the phosphors becoming larger, and the light-emitting device becoming heavier. There is also a problem that it is difficult to make the light-emitting device thinner.

The present invention was created to solve the abovementioned problems, and aims at providing an illumination device capable of improving the utilization efficiency of light while being lighter and thinner, a display device, and a television receiver.

Means for Solving the Problems

To achieve the abovementioned goals, an illumination device of the present invention is an illumination device placed on a back side of a member to be illuminated, having: a light source that emits ultraviolet light; a light guide plate having a light incident surface whereon light from the light source is incident and a light exiting surface wherefrom light exits, the light guide plate guiding light from the light source;

an optical member placed between the light source and the light incident surface of the light guide plate, the optical member having an ultraviolet light incident surface whereon ultraviolet light from the light source is incident, the optical member allowing ultraviolet light to pass through and reflecting visible light; and a fluorescent member placed between the ultraviolet light incident surface of the optical member and the light incident surface of the light guide plate, the fluorescent member converting ultraviolet light into visible light, wherein the light incident surface of the light guide plate has a smaller area than the light exiting surface.

In the illumination device, as described above, an optical member that allows ultraviolet light emitted from the light source to pass through and that reflects visible light, and a fluorescent member that converts the ultraviolet light into visible light, are provided between the light source and the light guide plate. In this way, the ultraviolet light emitted from the light source passes through the optical member and is converted into visible light by the fluorescent member, and is then incident on the light guide plate. A portion of the visible light that is incident on the light guide plate is reflected by the opposing surface opposite to the light incident surface of the light guide plate, and this light is emitted to the light source side from the light incident surface. The visible light emitted from the light incident surface is reflected by the optical member.

In the illumination device, it is preferable to further include a first reflective member that reflects lights, the first reflective member being placed on at least one of a side of the optical member near the member to be illuminated and a side of the optical member opposite to the member to be illuminated.

In the illumination device provided with the first reflective member, it is preferable for the first reflective member to be placed on the side of the optical member near the member to be illuminated. If done as such, visible light reflected by the optical member, visible light converted by the fluorescent member, and the like can be suppressed from leaking toward the member to be illuminated.

In this case, it is preferable for the first reflective member placed on the side of the optical member near the member to be illuminated to extend to cover an edge of the light guide plate near the light incident surface. If done as such, suppression of visible light converted by the fluorescent member leaking toward the member to be illuminated without being guided by the light guide plate is possible. This enables suppression of bright spots from occurring at the location of the member to be illuminated corresponding to the edge of the light guide plate near the light incident surface. In other words, the occurrence of unevenness in brightness of the member to be illuminated can be suppressed.

In the illumination device provided with the first reflective member, it is preferable for the optical member to reflect light from the light guide plate towards the first reflective member.

In the illumination device, it is preferable for the optical member to include a dichroic prism.

In the illumination device, the fluorescent member may be placed between the optical member and the light guide plate.

In the illumination device, the fluorescent member may be integrally formed with the optical member.

In the illumination device, it is preferable to further include a second reflective member that reflects light, the second reflective member being provided on an opposing surface opposite to the light incident surface of the light guide plate. If done as such, visible light that is incident on the light incident surface and that reaches the opposing surface can be suppressed from being emitted to outside from the opposing surface.

A display device of the present invention includes: the illumination device having the configurations described above; and a display panel illuminated by the illumination device.

In the display device, it is preferable for the display panel to be a liquid crystal display panel using liquid crystal.

A television receiver of the present invention includes the display device having the configurations described above.

Effects of the Invention

According to the present invention as described above, an optical member that allows ultraviolet light emitted from a light source to pass through and that reflects visible light, and a fluorescent member that converts the ultraviolet light into visible light, are provided between the light source and a light guide plate. By doing this, visible light reflected by an opposing surface of the light guide plate and emitted to the light source side from a light incident surface is reflected by the optical member. Therefore, visible light reaching the light source and then being absorbed by part of the light source with low reflectance of visible light can be suppressed, and the utilization efficiency of the light can be improved.

As described above, the optical member and the fluorescent member are provided between the light source and the light guide plate. In other words, the optical member and the fluorescent member are placed so as to oppose the light incident surface of the light guide plate. This allows for the optical member and the fluorescent member to be smaller and for the illumination device to be lighter than if the optical member and fluorescent member are provided on the light exiting surface (the surface near the member to be illuminated) of the light guide plate. The illumination device can also be made thinner in this way than if the optical member and fluorescent member are provided on the light exiting surface of the light guide plate.

DETAILED DESCRIPTION OF EMBODIMENTS

Embodiments of the present invention will be explained below with reference to the drawings. For clarity, hatching is not used in some cross-sectional views.

A structure of a display device 1 according to Embodiment 1 of the present invention will be explained below with reference to FIGS. 1 to 3.

The display device 1 of Embodiment 1 of the present invention is used in a mobile liquid crystal display device, for example. As shown in FIG. 1, the display device 1 is made of a display panel 2 (a member to be illuminated), and an illumination device 10, which is placed on the back side of the display panel 2, that illuminates the display panel 2. The "back side" (the bottom side in FIG. 1) in the "back side of the display panel 2" is a directional concept that also applies to other configuration elements.

The display panel 2 is a liquid crystal display panel that has two glass substrates with a not-shown liquid crystal layer interposed therebetween. The display panel 2 displays images by being illuminated by the illumination device 10.

The illumination device 10 is an edge-lit (also called side-lit) backlight device. The illumination device 10 includes: a plurality of light sources 11; a mounting substrate 12 whereon the plurality of light sources 11 are mounted; a heat spreader 13 to which the mounting substrate 12 is attached; a light guide plate 14 that guides light from the light sources 11; an optical member 15 and a fluorescent member 16 placed between the light sources 11 and the light guide plate 14; a reflective sheet 17 placed on the back side of the light guide plate 14; and a plurality of optical sheets 18 placed on a light exiting surface (front surface) 14a (the display panel 2 side) of the light guide plate 14. A backlight chassis (not shown) may be provided to house these.

The plurality of light sources 11 are arrayed laterally to the light guide plate 14, and are formed so as to emit light towards a light incident surface 14b of the light guide plate 14. The plurality of light sources 11 are mounted on the mounting substrate 12, and are supplied power from the mounting substrate 12. The mounting substrate 12 is attached to the metal heat spreader 13, and the heat emitted by the light sources 11 is dissipated by the heat spreader 13 via the mounting substrate 12. As shown in FIG. 2, a reflective layer 19 made of a white resist, white tape, or the like may be provided on a prescribed area on the surface of the mounting substrate 12. If this is done, light that returns to the light sources 11 by being reflected or the like by the surface of the optical member 15 can be reflected again in the direction of the optical member 15.

The light sources 11 are LEDs, for example. The light sources 11 emit ultraviolet light, and emit near-ultraviolet light having a central wavelength greater than or equal to 350 nm and less than or equal to 400 nm, for example.

Figure 1:
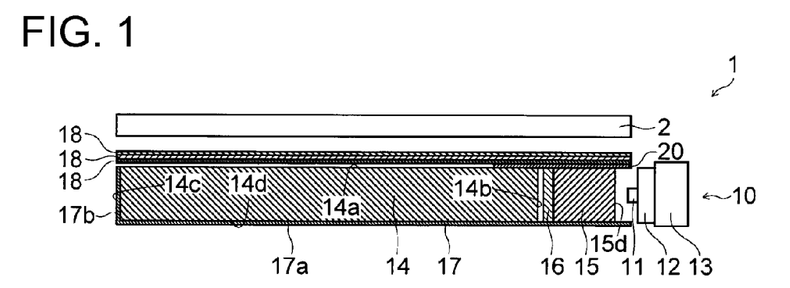
FIG. 1 is a cross-sectional view showing a structure of a display device according to Embodiment 1 of the present invention.
Figure 2:
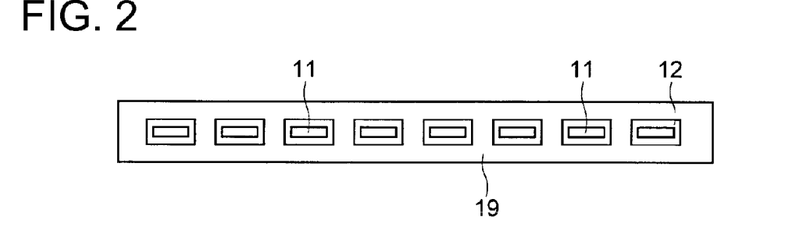
FIG. 2 is a view showing a state in which a reflective layer has been provided on a mounting substrate according to Embodiment 1 of the present invention.

As shown in FIG. 1, the light guide plate 14 includes the light exiting surface 14a, a light incident surface 14b whereon light from the light sources 11 is incident, an opposing surface 14c placed on the side opposite to the light incident surface 14b, and a rear surface 14d. The light guide plate 14 is formed in a rectangular prism, and the light exiting surface 14a and the rear surface 14d are the surfaces with the largest areas in the light guide plate 14. In other words, the light incident surface 14b has a smaller area than the light exiting surface 14a. The light guide plate 14 also functions to guide light incident on the light incident surface 14b and to change the progression direction of the light so that the light is emitted to the display panel 2. A portion of the light that is incident on the light incident surface 14b reaches the opposing surface 14c, and is reflected by a side part 17b, described later, of the reflective member 17.

The optical member 15 functions to allow ultraviolet light to pass through and reflects visible light. Specifically, the optical member 15 allows light with a wavelength less than or equal to 400 nm to pass through, and reflects light with a wavelength greater than 400 nm. The transmittance of ultraviolet light from the optical member 15 is approximately 95%, and the reflectance of visible light is approximately 98%, for example.

Figure 3:
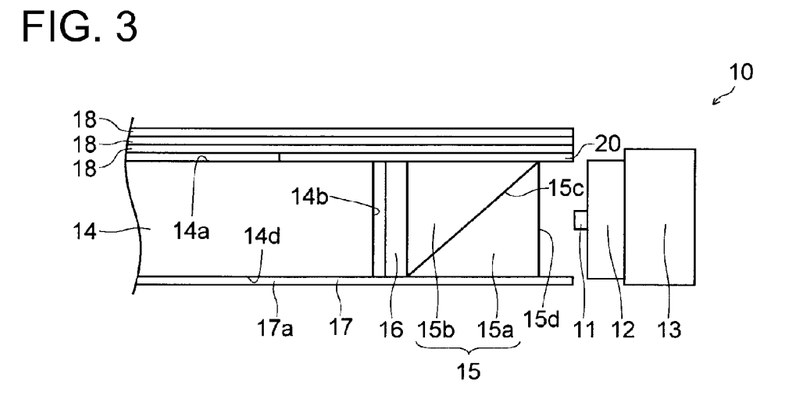
FIG. 3 is an expanded cross-sectional view showing the structure of the display device according to Embodiment 1 of the present invention.

As shown in FIG. 3, the optical member 15 is a dichroic prism (also called dichroic minor). Specifically, the dichroic prism (the optical member 15) is made of two triangular-prism glass members 15a and 15b that extend in the array direction (the direction perpendicular to the paper in FIG. 3) of the light sources 11, and a dielectric multi-layer film 15c placed between these two glass members 15a and 15b. The surface of the glass member 15a close to the light sources 11 acts as an ultraviolet light incident surface 15d whereon ultraviolet light from the light sources 11 is incident. The boundary of the glass member 15a and the glass member 15b is tilted at a 45 degree angle toward the optical axis of the light sources 11.

It is preferable for the optical member 15 to be in contact with the reflective sheet 17 and a reflective tape 20, which is described later. If the thickness of the optical member 15 is greater than or equal to the thickness of the light guide plate 14, then it is possible for the optical member 15 to easily be in contact with the reflective sheet 17 and the reflective tape 20 described later.

The fluorescent member 16 is placed between the optical member 15 and the light guide plate 14. The fluorescent member 16 is placed between the ultraviolet light incident surface 15d of the optical member 15 and the light guide plate 14. In Embodiment 1, the fluorescent member 16 is formed on the surface of the optical member 15.

The fluorescent member 16 functions to convert ultraviolet light into visible light and then emit the visible light. Specifically, the fluorescent member 16 includes three types of phosphors (not shown) that convert the ultraviolet light into red light, green light, and blue light, respectively. Therefore, the visible light (red light, green light, and blue light) emitted from the fluorescent member 16 is mixed and becomes white light. The fluorescent member 16 is made of the phosphors, and a binder formed from a material (glass such as low-melting point glass, or a resin, for example) that allows at least ultraviolet light to pass through.

The reflective tape 20 (the first reflective member), which functions to reflect light, is placed on the display panel 2 side of the optical member 15. This reflective tape 20 is extended so as to cover the display panel 2 side of the fluorescent member 16 and the display panel 2 side of an edge of the light guide plate 14 on the light incident surface 14b side. Specifically, the reflective tape 20 is placed so as to cover an approximately 3 mm to 10 mm area of the light guide plate 14 from the light incident surface 14b. By doing this, the visible light reflected by the optical member 15, the visible light converted by the fluorescent member 16, and the like can be suppressed from leaking to the display panel 2 side. The reflective tape 20 may be attached to the optical member 15 and the light guide plate 14, or may be attached to the optical sheets 18.

The reflective sheet 17 includes a back part 17a that covers the rear surface 14d of the light guide plate 14, and the side part 17b (the second reflective member) (see FIG. 1) that covers the opposing surface 14c of the light guide plate 14. In this way, light that leaks from the rear surface 14d and the opposing surface 14c of the light guide plate 14 is reflected by the reflective sheet 17 and returns to the light guide plate 14. The back part 17a is formed to also cover the back of the optical member 15 and the back of the fluorescent member 16. By doing this, light that leaks from the back of the optical member 15 and the fluorescent member 16 is reflected by the reflective sheet 17 and returns to the optical member 15 and the fluorescent member 16.

The plurality of optical sheets 18 are a diffusion plate, a prism sheet, a lens sheet, and the like, and function to diffuse light from the light guide plate 14 and concentrate it to a prescribed viewing angle. The diffusion plate, prism sheet, lens sheet, and the like may be provided or not provided as necessary.

Figure 4:
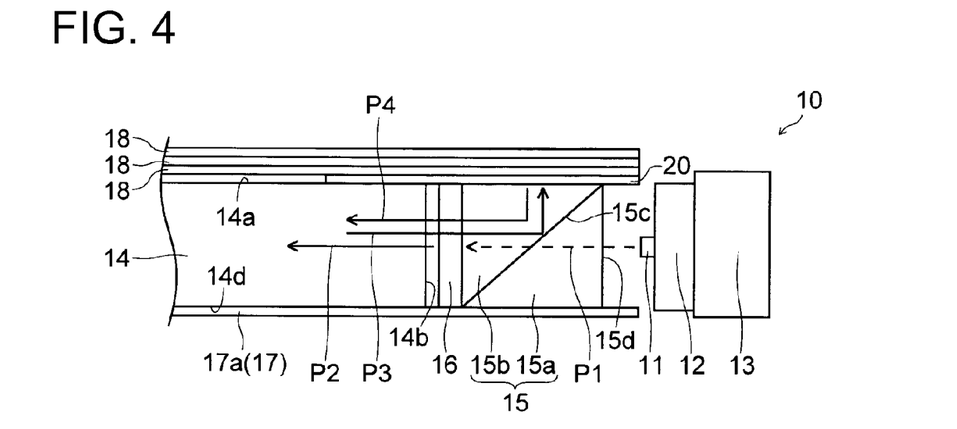
FIG. 4 is an expanded cross-sectional view for explaining light emitted from a light source of the display device according to Embodiment 1 of the present invention.

Next, light emitted from the light sources 11 will be briefly explained with reference to FIGS. 1 to 4. In FIG. 4, ultraviolet light is shown with a dotted line, and visible light is shown with a solid line.

As shown in FIG. 4, ultraviolet light P1 emitted from the light sources 11 is incident on the ultraviolet light incident surface 15d of the optical member 15 (the glass member 15a), passes through the dielectric multi-layer film 15c, and is then emitted from the light exiting surface (the surface of the optical member 15 near the light guide plate 14). The ultraviolet light P1 is incident on the fluorescent member 16, is converted to visible light P2, and is then incident on the light guide plate 14.

A large portion of the visible light P2 is emitted towards the display panel 2 from the light exiting surface 14a while being guided by the light guide plate 14. Meanwhile, a portion of the visible light P2 reaches the opposing surface 14c (see FIG. 1) of the light guide plate 14 and is reflected by the side part 17b (see FIG. 1) of the reflective sheet 17. Visible light P3 reflected by the side part 17b is incident on the optical member 15 (the glass member 15b) and is reflected towards the reflective tape 20 at the boundary (the dielectric multi-layer film 15c) of the glass members 15a and 15b. The visible light P3 reflected by the optical member 15 is reflected by the reflective tape 20. Visible light P4 reflected by the reflective tape 20 is reflected by the boundary of the glass members 15a and 15b, and is incident again on the light guide plate 14.

In the present embodiment, as described above, an optical member 15 that allows ultraviolet light emitted from the light sources 11 to pass through and that reflects visible light, and a fluorescent member 16 that converts the ultraviolet light into visible light, are provided between the light sources 11 and the light guide plate 14. Thus, the ultraviolet light emitted from the light sources 11 passes through the optical member 15, is converted into visible light by the fluorescent member 16, and is then incident on the light guide plate 14. A portion of the visible light incident on the light guide plate 14 is reflected at the opposing surface 14c of the light guide plate 14, and is then emitted towards the light sources 11 from the light incident surface 14b. The visible light emitted from the light incident surface 14b is reflected by the optical member 15. Therefore, visible light reaching the light sources 11 and then being absorbed by part of the light sources 11 that has low visible light reflectance can be suppressed, and the utilization efficiency of light can be improved.

As described above, the optical member 15 and the fluorescent member 16 are provided between the light sources 11 and the light guide plate 14. In other words, the optical member 15 and the fluorescent member 16 are placed so as to oppose the light incident surface 14b of the light guide plate 14. This allows for the optical member 15 and the fluorescent member 16 to be smaller and for the illumination device 10 to be lighter than if the optical member 15 and fluorescent member 16 are provided on the light exiting surface 14a of the light guide plate 14. The illumination device 10 can also be made thinner by doing this than if the optical member 15 and fluorescent member 16 are provided on the light exiting surface 14a of the light guide plate 14.

Because it is particularly necessary for a display device for use in mobile devices to have improved utilization efficiency of light and to be lighter and thinner, having the display device 1 with the configuration described above would be especially useful.

As described above, the reflective tape 20 that reflects light is placed on the display panel 2 side of the optical member 15. This enables suppression of visible light reflected by the optical member 15, visible light converted by the fluorescent member 16, ultraviolet light emitted from the light sources 11, and the like from leaking towards the display panel 2. This allows for the utilization efficiency of light to be improved.

As described above, the reflective tape 20 that covers the optical member 15 extends to cover an edge of the light guide plate 14 on the light incident surface 14b side. This enables suppression of visible light converted by the fluorescent member 16 from leaking towards the display panel 2 without being guided by the light guide plate 14. This enables suppression of bright spots from occurring at the location of the display panel 2 corresponding to the edge of the light guide plate 14 near the light incident surface 14b. In other words, the occurrence of unevenness in brightness on the display panel 2 can be suppressed.

As described above, the optical member 15 reflects visible light that is from the light guide plate 14 towards the reflective tape 20. By doing this, the visible light reflected by the optical member 15 is reflected by the reflective tape 20, reflected by the optical member 15, and then incident again on the light guide plate 14. This allows for the utilization efficiency of light to be improved.

As described above, by providing the side part 17b on the reflective sheet 17, visible light that has reached the opposing surface 14c of the light guide plate 14 can be suppressed from being emitted to outside from the opposing surface 14c.

Figure 5:
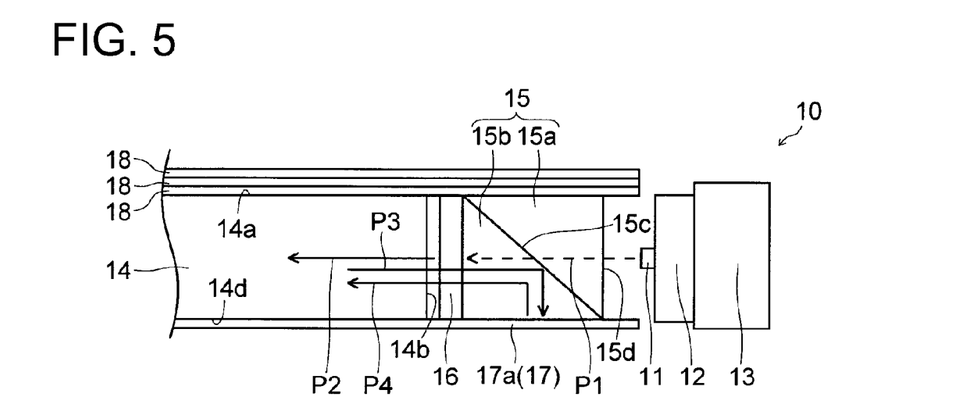
FIG. 5 is an expanded cross-sectional view showing a structure of a display device according to Embodiment 2 of the present invention.

As shown in FIG. 5, an illumination device 10 of Embodiment 2 of the present invention has an optical member 15 placed on the inverse side. In other words, the optical member 15 is placed so as to reflect light from a light guide plate 14 towards the rear surface. In Embodiment 2, the reflective tape 20 is not provided. This allows for a reduction in number of parts of the illumination device 10. The reflective tape 20 may be provided in a similar manner to Embodiment 1 described above.

In Embodiment 2, visible light P3 reflected by a side part 17b is incident on the optical member 15 (a glass member 15b), and is reflected to a back part 17a (a first reflecting member) of a reflective sheet 17 on a boundary (a dielectric multi-layer film 15c) of glass members 15a and 15b. The visible light P3 reflected by the optical member 15 is reflected by the back part 17a. Visible light P4 reflected by the back part 17a is reflected at the boundary of the glass members 15a and 15b, and is incident again on the light guide plate 14.

Other structures, effects, and progressions of light emitted from the light sources in Embodiment 2 are the same as Embodiment 1 described above.

The presently disclosed embodiments are wholly illustrative and not to be construed as limiting. The scope of the present invention is shown in the claims and not the embodiments described above, and in addition, all modifications within the equivalent meaning and scope of the claims are included.

In the embodiments described above, examples were shown of a display panel applied to a liquid crystal display panel, but the present invention is not limited thereto, and may be applied to a display panel other than a liquid crystal display panel, for example.

In the embodiments described above, a backlight device that illuminates a display panel was explained as one example of an illumination device, but the present invention is not limited thereto, and can also be applied to an illumination device that illuminates a member to be illuminated other than a display panel.

Figure 6:
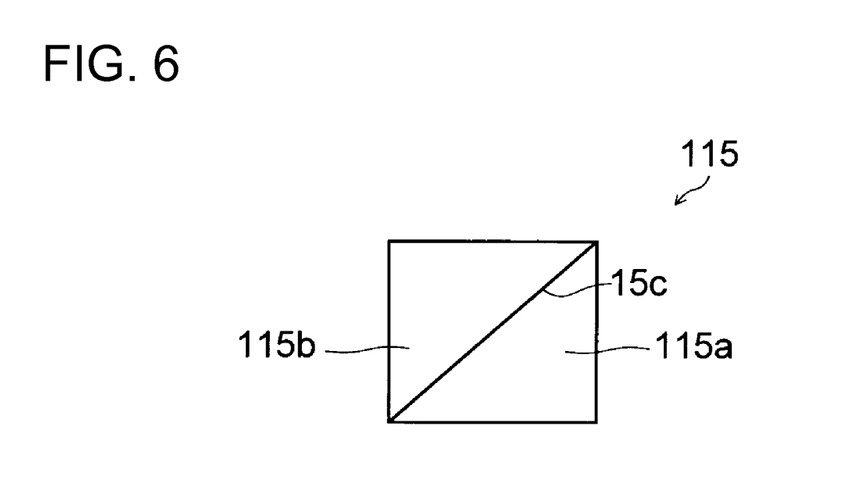
FIG. 6 is an expanded view showing a structure of an optical member according to Modification Example 1 of the present invention.

In the embodiments described above, examples were shown in which the fluorescent member was formed on the surface of the optical member, but the present invention is not limited thereto. The fluorescent member may be formed on the surface (the light incident surface) of the light guide plate, or the fluorescent member may not be formed on the surface of the optical member and the light guide plate. The fluorescent member may also be formed as an optical member 115 according to Modification Example 1 of the present invention shown in FIG. 6. Specifically, phosphors may be included in a glass member 115b of the optical member 115, and the glass member 115b of the optical member 115 may be used as the fluorescent member. In other words, the fluorescent member may be integrally formed with the optical member 115. If this is done, the illumination device can be made smaller. It is necessary to include the phosphors in the glass member 115b placed on the light guide plate side, and not a glass member 115a placed on the light source side.

Figure 7:
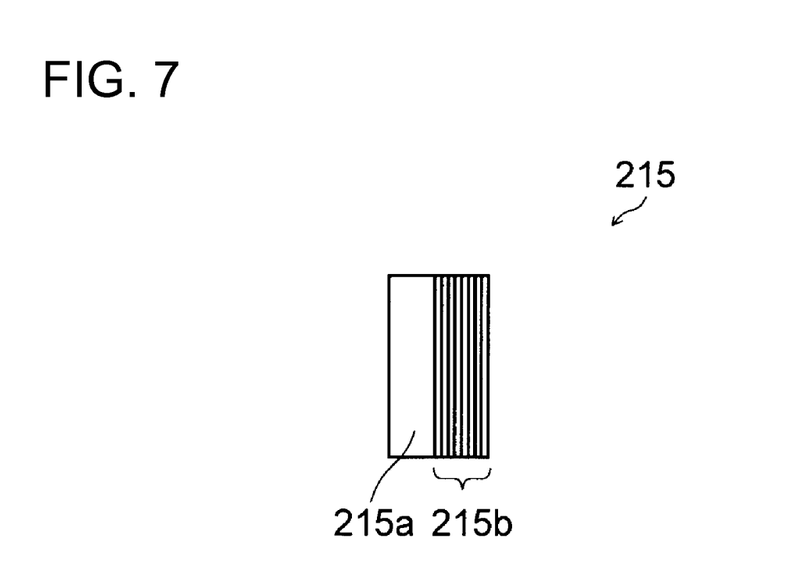
FIG. 7 is an expanded view showing a structure of an optical member according to Modification Example 2 of the present invention.

In the embodiments described above, examples in which the optical member is a dichroic prism were explained, but the present invention is not limited thereto, and may be formed as an optical member 215 according to Modification Example 2 of the present invention shown in FIG. 7, for example. In other words, the optical member 215 may be formed of a support member 215a such as transparent glass, and a multi-layer interference film 215b formed on the surface of the support member 215a. In this case, the interference film 215b may be made of alternately laminated $Ta_2O$ and $SiO_2$ films, or alternately laminated $TiO_2$ and $SiO_2$ films.

Figure 8:
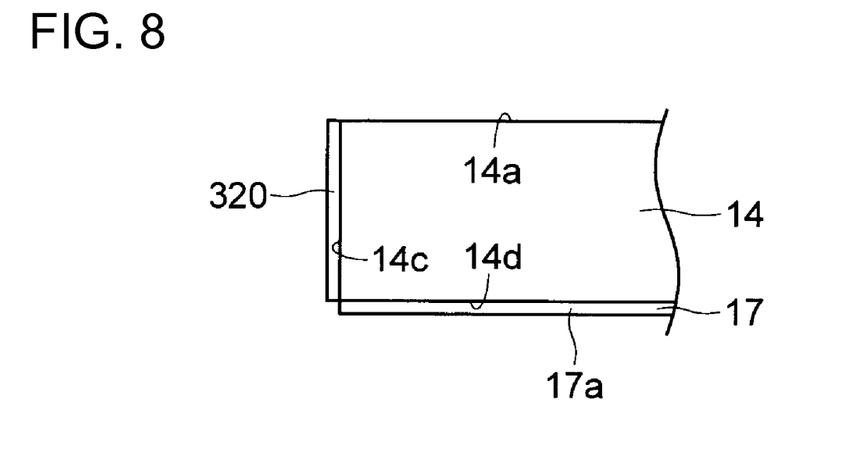
FIG. 8 is an expanded cross-sectional view showing a structure of an illumination device according to Modification Example 3 of the present invention.

In the embodiments described above, examples in which a side part is provided on a reflective sheet were shown, but the present invention is not limited thereto. A reflective tape 320 or the like may be provided on the outer side of the opposing surface 14c of the light guide plate 14, without providing the side part 17b on the reflective sheet 17, as in an illumination device according to Modification Example 3 of the present invention shown in FIG. 8, for example.

Figure 9:
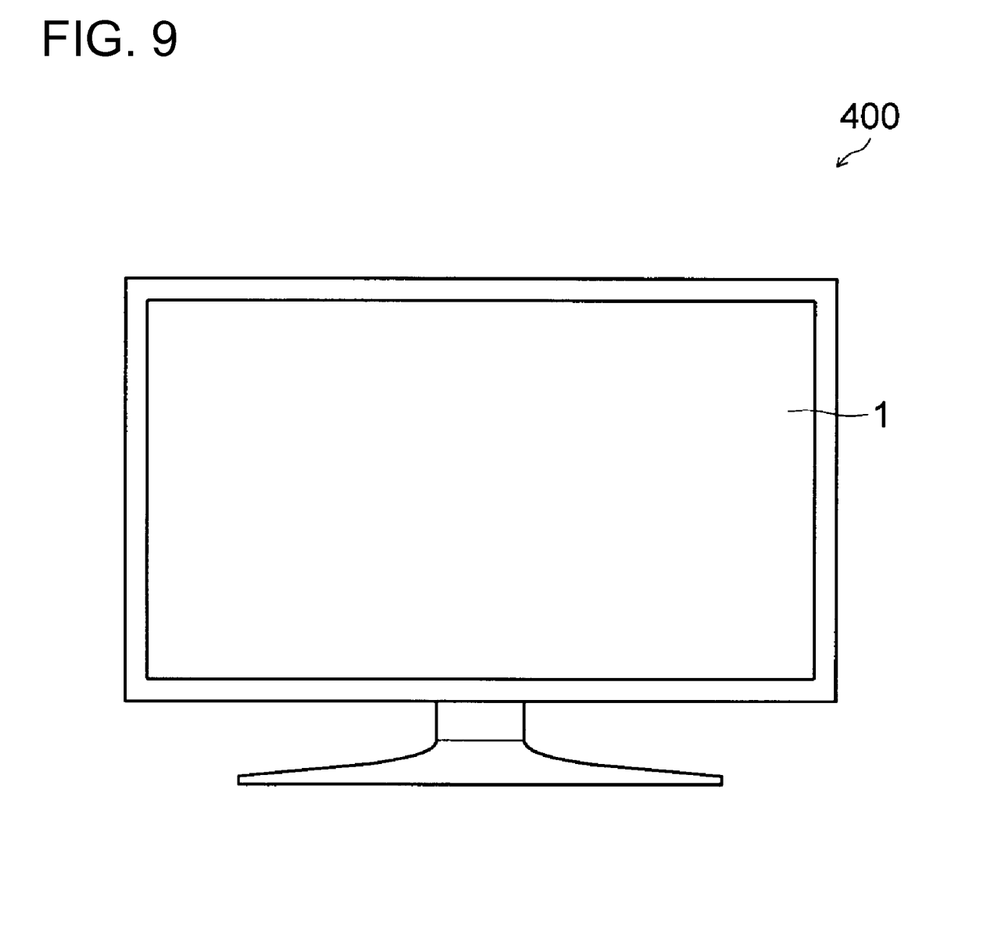
FIG. 9 is a front view showing a structure of a television receiver according to Modification Example 4 of the present invention.

In the embodiments described above, a display device was explained as being used in a mobile liquid crystal display device, for example, but the present invention is not limited thereto. A display device 1 may be used for a television receiver 400 as with Modification Example 4 of the present invention shown in FIG. 9, for example.

DESCRIPTION OF REFERENCE CHARACTERS 1 display device
2 display panel (member to be illuminated, liquid crystal display panel)
10 illumination device
11 light source
14 light guide plate
14b light incident surface
14c opposing surface
15, 215 optical member
15d ultraviolet light incident surface
16 fluorescent member
17a back part (first reflective member)
17b side part (second reflective member)
20 reflective tape (first reflective member)
115 optical member (fluorescent member)
320 reflective tape (second reflective member)
400 television receiver

The invention claimed is:

1. An illumination device placed on a back side of a member to be illuminated, comprising:
a light source that emits ultraviolet light;
a light guide plate having a light incident surface whereon light from the light source is incident and a light exiting surface wherefrom light exits, the light guide plate guiding light from the light source;
an optical member placed between the light source and the light incident surface of the light guide plate, the optical member having an ultraviolet light incident surface whereon ultraviolet light from the light source is incident, the optical member allowing ultraviolet light to pass through and reflecting visible light; and
a fluorescent member placed between the ultraviolet light incident surface of the optical member and the light incident surface of the light guide plate, the fluorescent member converting ultraviolet light into visible light,
wherein the light incident surface of the light guide plate has a smaller area than the light exiting surface.

2. The illumination device according to claim 1, further comprising a first reflective member that reflects light, the first reflective member being placed on at least one of a side of the optical member near the member to be illuminated and a side of the optical member opposite to the member to be illuminated.

3. The illumination device according to claim 2, wherein the first reflective member is placed on the side of the optical member near the member to be illuminated.

4. The illumination device according to claim 3, wherein the first reflective member placed on the side of the optical member near the member to be illuminated extends to cover an edge of the light guide plate near the light incident surface.

5. The illumination device according to claim 2, wherein the optical member reflects light from the light guide plate towards the first reflective member.

6. The illumination device according to claim 1, wherein the optical member comprises a dichroic prism.

7. The illumination device according to claim 1, wherein the fluorescent member is placed between the optical member and the light guide plate.

8. The illumination device according to claim 1, wherein the fluorescent member is integrally formed with the optical member.

9. The illumination device according to claim 1, further comprising a second reflective member that reflects light, the second reflective member being provided on an opposing surface that is opposite to the light incident surface of the light guide plate.

10. A display device, comprising:
the illumination device according to claim 1; and
a display panel illuminated by the illumination device.

11. The display device according to claim 10, wherein the display panel is a liquid crystal display panel using liquid crystal.

12. A television receiver comprising the display device according to claim 10.

* * * * *